United States Patent

[11] 3,626,113

[72] Inventors James W. Jones;
Herbert R. Stollorz, both of Redwood City, Calif.
[21] Appl. No. 25,793
[22] Filed Apr. 6, 1970
[45] Patented Dec. 7, 1971
[73] Assignee Ampex Corporation
Redwood City, Calif.

[54] SLIDING TRANSDUCER CARRIAGE FOR DISC RECORDER
1 Claim, 4 Drawing Figs.

[52] U.S. Cl. .......... 179/100.2 T, 179/100.2 CA
[51] Int. Cl. .......... G11b 5/54, G11b 21/04
[50] Field of Search .......... 179/100.2 CA, 100.2 MD, 100.2 T; 178/6.6 FS, 6.6 DD; 340/174.1 C; 335/285; 248/206 A; 211/DIG. 1; 269/8; 274/23 A

[56] References Cited
UNITED STATES PATENTS

| | | | |
|---|---|---|---|
| 3,539,716 | 11/1970 | Stratton et al. | 179/100.2 MD |
| 2,441,060 | 5/1948 | Cunningham | 211/DIG. 1 |
| 2,659,169 | 11/1953 | Brennan | 248/206 A |

*Primary Examiner*—Bernard Konick
*Assistant Examiner*—Robert S. Tupper
*Attorney*—Robert G. Clay

ABSTRACT: A carriage slide assembly for transporting a magnetic-transducing head relative to the surface of a magnetic storage disc wherein a carriage for the head is slidably disposed on a carriage arm formed of ferromagnetic material. In order to reduce inertia and sliding friction of the carriage, magnetic means in the form of a pair of permanent magnets are fixed to the carriage for spatial magnetic field coupling with the ferromagnetic arm thereby holding the carriage to the arm by magnetic force components generally transverse to the direction of carriage movement.

*INVENTORS*
JAMES W. JONES
HERBERT R STOLLORZ
BY
*Larry A. Jackson*
*ATTORNEY*

SLIDING TRANSDUCER CARRIAGE FOR DISC RECORDER

In general the present invention relates to sliding carriage assemblies and more particularly to a sliding carriage for transporting a magnetic-transducing head between selected radial locations with respect to a magnetic storage disc.

Disc recorders are used in a variety of applications, such as for recording and reproducing digital, instrumentation and video signals. In many of these machines, it is necessary to rapidly shift the carriage upon which the magnetic-transducing head is mounted between one radial location with respect to the disc surface to another radial position. For example, in one type of disc recorder adapted for first-recording television signals and thereafter reproducing such signals in a variety of different modes, each successive field of the video signal is recorded at a different radial position of the transducing head so as to provide a plurality of concentric circular recorded tracks, each carrying a field segment of the original video signal. Flexibility during playback is achieved by rapidly moving the reproduce head in preselected sequence of radial steps, each step positioning the head so as to reproduce one of the concentric tracks with the disc rotating during the interval between the radial stepping moves of the head carriage so as to reproduce the recorded video fields in a desired sequence, thereby achieving effects such as slow motion, stop action, reverse motion and accelerated motion. Such a recording and reproducing system is disclosed in a U.S. application No. 713,901 for METHOD AND APPARATUS FOR RECORDING AND REPRODUCING TELEVISION OR OTHER BROAD BAND SIGNALS WITH AN ALTERED TIME BASE EFFECT, by Burnet M. Poole, filed Mar. 18, 1968 and assigned to the assignee of the present application. It will be apparent that this and other types of disc recorders require an electromechanical means capable of effecting the extremely rapid step adjustments in the radial position of the head carriage. For example, in the apparatus disclosed in the above-noted application, several highly advantageous features are provided for rapidly and precisely stepping a carriage assembly slidably mounted for straight line reciprocation along a carriage arm disposed to radially span across a disc surface. Stepping of the carriage is achieved by a stepper motor having a steel belt drive coupled to the carriage. In order to optimize the system's performance, the carriage is constructed so as to present the least amount of sliding friction and to have the smallest possible mass for minimizing the inertia thereof. While a carriage of the lightest possible weight and having minimal sliding friction is thus desirable, it has heretofore been found that proper straight line guiding of the carriage along the arm requires a carriage assembly which wraps substantially around the circumference of the carriage arm. This being done so as to afford mounting positions for spring-loaded wheels or rollers for resiliently forcing bearing surfaces of the carriage to seat against cooperating track surfaces of the arm. The use of spring-loaded rollers or equivalent means and the additional carriage mass required by the wraparound structure, have greatly restricted the extent to which the inertia and friction of the carriage can be minimized. Furthermore, as the cross section of the carriage arm must be increased in certain cases in order to achieve a higher stiffness, the increased arm cross section, of course, requires a corresponding increase in the necessary mass of the carriage by reason of the additional material for wrapping around the larger arm circumference.

Additionally, it has been found that existing carriage assemblies are difficult to remove from the carriage arm such that servicing of the transducer head and accessories carried thereby becomes time consuming and thus costly.

Accordingly, it is an object of the present invention to provide a slidable carriage assembly satisfying the precision registration tolerances of a magnetic disc transport and yet exhibiting a substantial reduction in inertia and friction so as to afford a corresponding increase in the response time of the carriage to a stepping force.

It is a further object of the present invention to provide such a carriage assembly having a construction readily removed and installed with respect to its mounted position on the carriage arm, so as to facilitate servicing of components held by the carriage.

These and other objects are achieved in accordance with the present invention by a unique assembly wherein the carriage is forcefully maintained in a seated, although sliding, relation with the carriage arm by magnetic means mounted on the carriage and providing a coupling force in cooperation with a magnetic carriage arm.

These and other objects, features and advantages of the invention will become apparent from the following description and accompanying drawings and illustrating the preferred embodiment of the invention, wherein.

Figure 1:
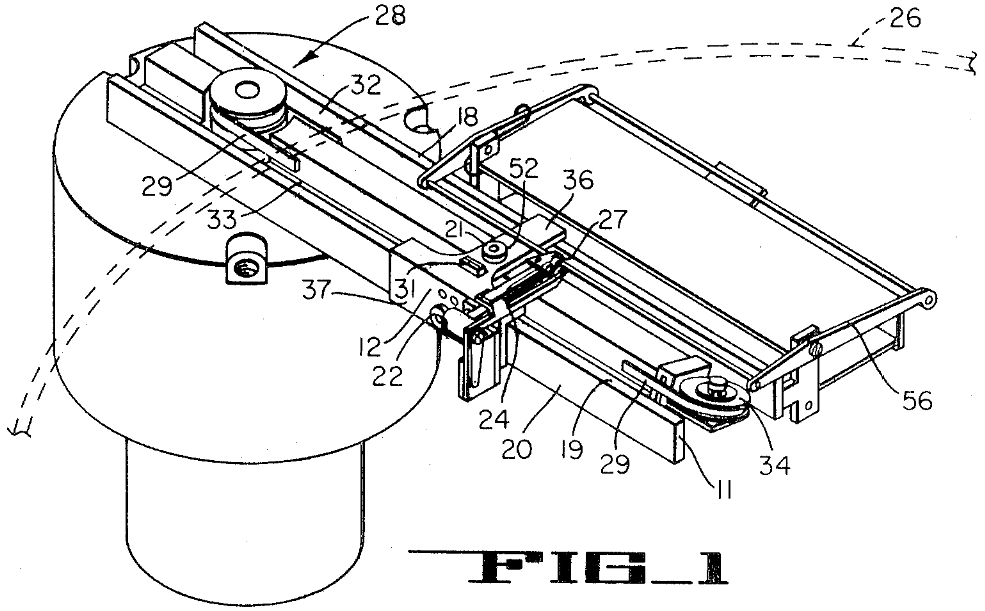
FIG. 1 is a perspective view of a stepper assembly for transporting the magnetic-transducing head relative to a surface of the magnetic storage disc, wherein such assembly employs a sliding carriage constructed in accordance with the present invention.

Referring to FIG. 1, the present invention includes a carriage arm 11 formed of a magnetically susceptible material such as steel, a carriage 12 disposed for rectilinear movement relative to arm 11 with bearing members 13, 14, 15, 16 and 17 rigidly fastened to the carriage providing spaced apart bearing surfaces for slidably engaging track surfaces 18, 19 and 20 extending longitudinally on arm 11. In order to maintain the bearing surfaces of members 13–17 slidably seated against the cooperating surfaces 18–20 of arm 11, a pair of cylindrical permanent magnets 21 and 22 are fixed to carriage 12 so as to be in proximate but slightly spaced apart relation with adjacent carriage arm surfaces, in this instance arm surfaces 20 and 23. The magnets are forcefully attracted toward the ferromagnetic material provided by the steel construction of carriage arm 11, thereby forcing the respective bearing surfaces of members 13–17 to positively engage and seat against the cooperating surfaces of the carriage arm.

In the preferred form of the invention, carriage 12 serves as a means for transporting a magnetic head mount assembly 24 in a radial path with respect to the magnetic storage or recording surface of a rotating disc 26, here shown by dotted lines in FIG. 1. In this instance, disc 26 is adapted for disposition overlying carriage 12 and head mount assembly 24 such that a magnetic-transducing head 27 carried by assembly 24 engages an underneath surface of disc 26 as it is shown in FIG. 1. By virtue of the magnetic-holding force provided by permanent magnets 21 and 22, the size and weight of carriage 12 can be significantly reduced so as to permit rapid radial shifting of the position of head 27 with respect to disc 26 in response to step movements of a controlled stepper motor drive 28. Drive 28 includes a belt 29, which although not shown, is coupled to carriage 12 by means of a clamping fixture 31. Carriage arm 11 is formed with a pair of longitudinal channels 32 and 33 to accommodate the movement of belt 29 about a return pulley 34.

Figure 2:
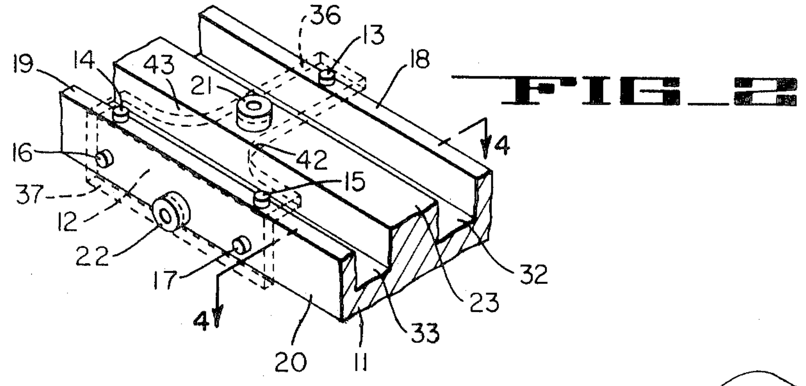
FIG. 2 is an exploded view of a portion of FIG. 1, wherein the carriage is shown by dotted lines for clarity.
Figure 4:
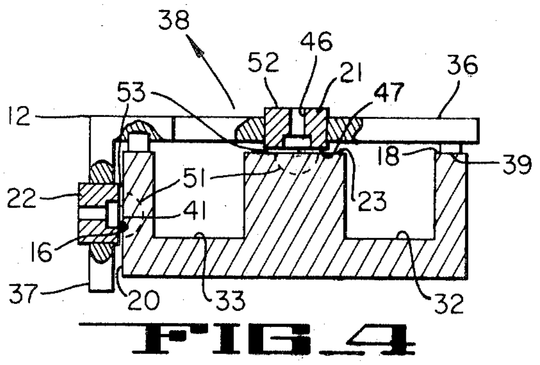
FIG. 4 is a cross section taken generally along lines 4—4 of FIG. 2, and having portions cut away for clarity.

With reference to FIGS. 2 and 4, carriage arm 11 is preferably formed with a pair of right-angle surfaces, such as surface 20 with respect to either track surface 18 or 19, so as to present two-orthogonal planes relative to which carriage 12 can be precisely guided. Particularly, track surfaces 18 and 19 of arm 11 are disposed in a line precisely parallel to the surface of disc 26 while surface 20 is similarly aligned parallel to the diameter of the disc and normal to the surface thereof. In order to take advantage of the orthogonal guiding surfaces of arm 11, carriage 12 is preferably formed in an "L"-shape with right-angled legs 36 and 37 such that the adjacent inwardly facing surfaces of the legs are adapted to matingly span the right-angled surfaces 18–20 of arm 11 as shown. This provides an optimum configuration for obtaining the necessary guiding of the carriage which at the same time minimizes the mass thereof. Moreover, this construction facilitates removal and replacement of the carriage with respect to its mounted sliding position on arm 11. As readily visualized from FIGS. 1, 2 and 4, the entire carriage including head mount assembly 24 affixed thereto is easily released from arm 11 by manually grasping and pulling it away therefrom in a direction indicated by arrow 38 in FIG. 4.

In addition, carriage legs 36 and 37 provide a convenient and easily manufactured mounting platform for bearing members 13–17. As best illustrated by FIGS. 2 and 4, members 13–17 are in the shape of cylindrical pods, each of which has one end seated within a mated mounting hold and being held in place by a suitable means such as press fitting and/or epoxy adhesive. The remaining ends of each of bearing members 13–17 is provided with a planar bearing surface parallel to the plane of the carriage leg from which it extends. Thus, for example, carriage 12 is precisely positioned for rectilinear motion in a straight line path defined by means of engaging surfaces 18 and 39, respectively of arm 11 and member 13, and at least one other set of slidably engaging surfaces orthogonal to surfaces 18 and 39 such as for example provided by bearing surface 41 of member 16 and arm surface 20. Each of bearing members 13–17 are preferably formed of a graphite material for self-lubrication of the bearing surfaces.

Further precision in the guiding of the carriage is achieved by employing three-bearing members 13–15 carried by leg 36 in spaced apart relation so as to form a three-point tripodal bearing surface support for maintaining constant parallelism between the plane of leg 36 and the plane defined by surfaces 18 and 19 of arm 11. Magnet 21 also carried by arm 36 is advantageously disposed centrally of the tripodal region defined by members 13, 14 and 15 so as to evenly distribute the bearing pressure thereamong.

Carriage 12 is provided with cutout portions 42 and 43 so as to form a slender extended portion of leg 36 carrying bearing member 13 near the end thereof and a wider portion adjacent leg 37 for carrying bearing members 14 and 15 at spaced apart locations in line with track surface 19.

Guiding of carriage 12 in the remaining orthogonal plane is provided by disposing the pair of bearing members 16 and 17 in spaced apart relation on leg 37 and with permanent magnet 22 mounted substantially midway therebetween.

Figure 3:
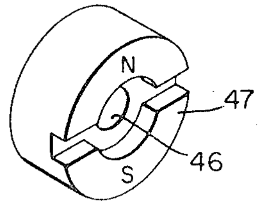
FIG. 3 is an enlarged perspective view of a permanent magnet forming one of the magnetic means mounted on the carriage of FIGS. 1 and 2 in accordance with the present invention.

Permanent magnets 21 and 22 having a configuration as shown by FIG. 3, have been found most satisfactory for practicing the present invention. As indicated, each of magnets 21 and 22 is of general cylindrical shape having an opening 36 extending coaxially therethrough and a slotted end portion 47 provided by a rectangular slot extending generally along the diameter of one end of the cylindrically shaped magnet. Slotted end portion 47 presents a pair of opposite magnetic poles, here shown as north (N) and south (S) poles which create a magnetic flux field emanating from and closing on the respective poles. As shown by FIG. 4, the magnetically susceptible material of arm 11 serves as the most advantageous path for the magnet fields, as indicated by dotted lines 51, and in this manner the magnetic force couplings between magnets 21 and 22 and arm 11 are created. It will be appreciated that the above-described orientation of magnets 21 and 22 serves to provide magnetic forces having the directions of maximum strength perpendicular to the bearing surfaces of members 13–16 respectively associated therewith.

In order to insure maximum coupling force between the magnets and the carriage arm, carriage 12 is preferably formed of a nonmagnetic material, such as aluminum or in some cases a stiff plastic, In this instance, legs 36 and 37 of carriage 12 are formed with through mounting holes for receiving the outer cylindrical surfaces of magnets 21 and 22 in press fit engagement therewith.

While the spacing 53 between the pole surfaces of the ends of magnets 21 and 22 and the adjacent surfaces 20 and 23 of arm 11 may be varied depending upon such factors as the holding force required, the characteristic magnetic strength of the magnets used, the permitted tolerances in the production of the various parts, etc., a typical range of spacing 53 is from 8 to 10 thousands of an inch.

It might be expected that magnets 21 and 22 would adversely influence the magnetic recording and storage functions of the transducing head and storage disc. However, such has not been found the case. One precaution, however, which has been taken relates to the particular configuration of the permanent magnets, and particularly permanent magnet 21 which is in a position closest to head 27 and the surface of disc 26. It has been found that cylindrically shaped magnets such as employed here are preferably formed with both opening 46 and slotted end portion 47, which configuration seems to minimize the amount of magnetic field emanating from the opposite end of the magnet, that is from end portion 52, which is adjacent to the magnetic surface of disc 26 and thus most likely to affect the magnetic storage function thereof.

Further details regarding the construction and operation of stepper motor drive 28, belt 29, pulley 34, and head mount assembly 24 are available by reference to the above-mentioned application Ser. No. 713,901, and related applications referred to therein.

In order to retract head 27 away from the surface of disc 26 during start up of the transport, a retraction means including parallel bar assembly 56 is employed, as described in detail and claimed in a concurrently filed U.S. application Ser. No. 25,757, entitled "HEAD MOUNT RETRACTION ASSEMBLY FOR DISC RECORDER," by Herbert R. Stollorz, filed Apr. 6, 1970 and assigned to the assignee of the present application.

What is claimed is:

1. In a mount for providing movement of a magnetic-transducing head in a path transverse to the direction of movement of a magnetic storage medium, the combination comprising: a carriage arm mounted and extending across a surface of the medium, said arm being of a ferromagnetic material and having a pair of right-angled track surfaces; and a carriage for said head disposed for movement along the arm and having a pair of legs at relative right angles in a "L"-configuration cooperatively disposed relative to the right-angle tracks of said arm, bearing surfaces on said carriage legs for slidably engaging different track surfaces of said arm so as to guide said carriage in a straight line path there along, and magnetic means mounted on said carriage in proximate but spaced apart relation to said arm providing a magnetic force biasing said carriage bearing surfaces against the track surfaces of said arm, whereby said carriage may be released and removed from said arm in a direction traverse thereto by merely overcoming the magnetic biasing force.

* * * * *